United States Patent [19]

Manabe

[11] Patent Number: 5,708,901
[45] Date of Patent: Jan. 13, 1998

[54] COVER ASSEMBLY FOR A CAMERA

[75] Inventor: Mitsuo Manabe, Saitama, Japan

[73] Assignee: Fuji Photo Optical Co., Ltd., Saitama, Japan

[21] Appl. No.: 784,260

[22] Filed: Jan. 15, 1997

[30] Foreign Application Priority Data

Jan. 30, 1996 [JP] Japan .................................. 8-014252

[51] Int. Cl.$^6$ .................................................. G03B 17/02
[52] U.S. Cl. .................................................. 396/541
[58] Field of Search ........................... 396/6, 535, 541

[56] References Cited

U.S. PATENT DOCUMENTS 5,400,098  3/1995  Rydelek ................................. 396/535
5,576,782  11/1996  Kameyama ...................... 396/535 X Primary Examiner—Howard B. Blankenship
Attorney, Agent, or Firm—Young & Thompson

[57] ABSTRACT

A cover assembly for a camera having a metallic front cover. The metallic front cover is provided with an upheaval portion. An end surface of the upheaval portion is manufactured as a plane surface. A plastic inner frame is provided with a projection having a step. After the metallic front cover is attached to the inner frame, an ornamental member is pushed toward the metallic front cover such that engaging claws of the ornamental member are adjusted to recesses formed on the projection. The engaging claw is guided by the recess and engages with the step of the projection. A lower surface of the ornamental member abuts closely on the end surface of the upheaval portion. The metallic front cover is fixed by being caught between the ornamental member and the inner frame.

8 Claims, 4 Drawing Sheets

COVER ASSEMBLY FOR A CAMERA

BACKGROUND OF THE INVENTION

1. Field of the Invention

The present invention relates to a cover assembly for a camera and more particularly to a cover assembly in which a metallic cover is adapted to be mounted in a simple manner, inexpensively and attractively.

2. Description of the Related Art

In compact cameras whose lenses are not exchanged, so-called compact high-grade cameras are known. Such a camera employs a fixed focus lens of about 35 mm as a taking lens. The fixed focus lens has high portrayal performance. Further, such a camera employs a metallic cover made of titanium, aluminum and so forth for covering a main body of the camera so that it has a great feature in that the camera has a beautiful high-grace external appearance.

On the other hand, a compact camera having a zoom lens of 40 mm to 105 mm is on sale. The zoom lens is employed as a taking lens and has a large zoom ratio. In such a camera, as the taking lens is large, a lens barrel of the taking lens projects considerably, for example about 20 mm, from the front surface of the camera. Therefore, a main body of the camera is covered by a plastic cover which is moldable in any shape.

By the way, it is desired to represent a feeling of high-class camera by using a metallic cover for above-described compact camera in which a large taking lens is employed. Generally, a metallic plate is difficult to manufacture in a complex shape or a convex shape projecting considerably. Accordingly, it is very difficult to use the metallic plate as a cover for the lens barrel which projects considerably from the camera.

Therefore, a cover assembly as shown in FIG. 4 is supposed. In the cover assembly, a metallic cover 83 covers a plastic cover 81 which overspreads a main body 80. But a front portion 85 of a barrel cover 81a is not covered by the metallic cover 83 so that the plastic background appears at the front portion 85. The front portion 85 covers a corner portion 84a of a lens barrel 84 and has a big curvature.

In such a cover assembly, an end portion 83a (a portion shown by a broken line in FIG. 4) of the metallic cover 83 is bared at a boundary with the barrel cover 81a. Thus, the end portion 83a should be attractively manufactured. As a method for manufacturing attractively, it is known to use a diamond-cutter by which a surface is smoothly finished. The end portion 83a may be cut as an edge 83b shown by a solid line in FIG. 4 in such a manner. However, upon manufacturing by the diamond-cutter, the manufacturing cost increases so that it causes to increase the cost of the camera. Moreover, a gap should not be existed at the boundary between the edge 83b of the metallic cover 83 and the barrel cover 81a so that high accuracy is required to put the covers 81 and 83 together. Accordingly, there arises a problem in that not only the manufacturing cost of the metallic cover 83 but also the molding cost of the plastic cover 81 increase.

SUMMARY OF THE INVENTION

In view of the forgoing problems, a primary object of the present invention is to provide a cover assembly in which a metallic cover may be mounted on a camera at a lower cost.

Another object of the present invention is to provide a cover assembly in which a metallic cover may be mounted on a camera in a simple manner.

A further object of the present invention is to provide a cover assembly in which a metallic cover may be attractively mounted on a camera.

To achieve the above objects, according to the present invention, an ornamental member is provided. The ornamental member is attached to an inner frame which covers a front surface of a camera main body. A metallic front cover is fixed by being caught between the ornamental member and the inner frame. The front cover is provided with a circular upheaval portion which is formed on a central portion thereof. An end surface of the upheaval portion is manufactured as a plane surface in order to abut closely on a lower surface of the ornamental member. The lower surface is also manufactured as a plane surface.

In a preferred embodiment, an arcuate projection is formed on a central portion of the inner frame. The projection is provided with recesses and a step. An engaging members of the ornamental member is guided by the recess and engages with the step.

In a preferred embodiment, three engaging claws are integrally formed with the ornamental member as engaging members.

In the present invention, the front cover is attached to the front surface of the inner frame which is fixed to the main body of the camera. The ornamental member is pushed toward the front cover so that the engaging claw enters the inside of the upheaval portion. At this time, as the engaging claw is adapted to be adjusted to the recess, the engaging claw is guided by the recess and moves toward the main body. The upheaval portion of the ornamental member is higher than a predetermined height so that the lower surface of the ornamental member first abuts on the end surface of the upheaval portion.

Upon further pushing the ornamental member toward the front cover in this state, the upheaval portion is elastically deformed so that the engaging claw engages with the step of the projection. Thus, the front cover is fixed by being caught between the ornamental member and the inner frame in such a state that the lower surface of the ornamental member closely contacts with the end surface of the upheaval portion.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S)

Figure 2:
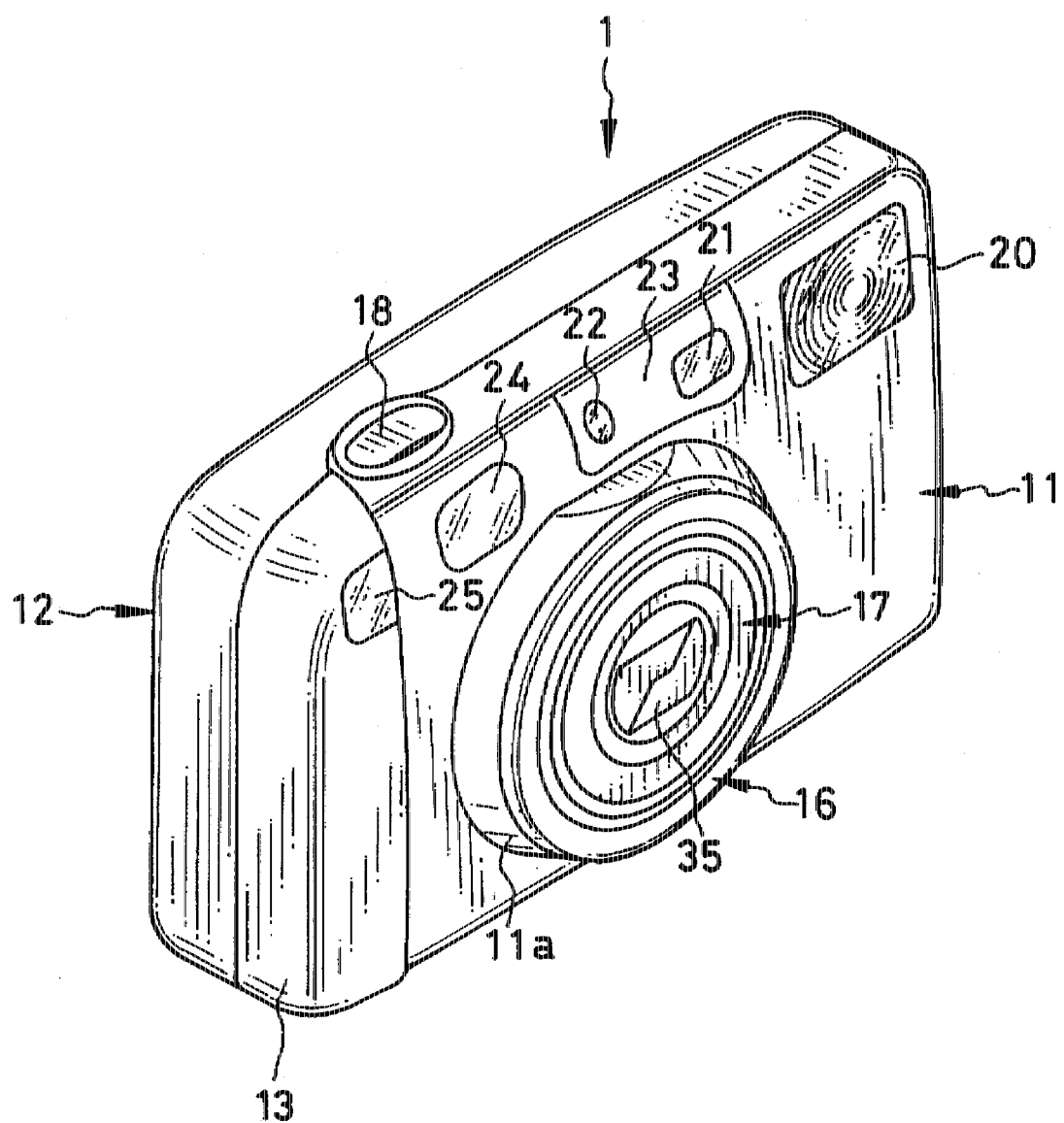
FIG. 2 is a perspective view illustrating an external appearance of a camera.

In FIG. 2 illustrating an external appearance of a camera according to the present invention, an outer wall of a camera 1 consists of a front cover 11, a rear cover 12 and a grip 13. The front cover 11 is made of aluminum and the rear cover 12 is made of plastic. The front cover 11 is provided with a circular upheaval portion 11a on the central portion thereof. The protruding portion is formed by raising a periphery of an opening formed in the front cover at a predetermined height. A ring-like ornamental member 16 is mounted on the top end of the protruding portion 11a. The ornamental member 16 is made of plastic. A lens barrel 17 for zoom lens is arranged inside of the ornamental member 16.

A shutter release button 18 is provided on the upper surface of the camera 1. Further, a flash window 20, a light emitting window 23, a light receiving window 24 and a red window 25 are provided on the front surface of the camera 1. The light emitting window 23 into which a finder window 21 and a photometric window 22 are incorporated and the light receiving window 24 are employed for auto-focus. A light receiving unit for remote control and a lump for indicating a self-timer are contained at the back of the red window 25.

Figure 3:
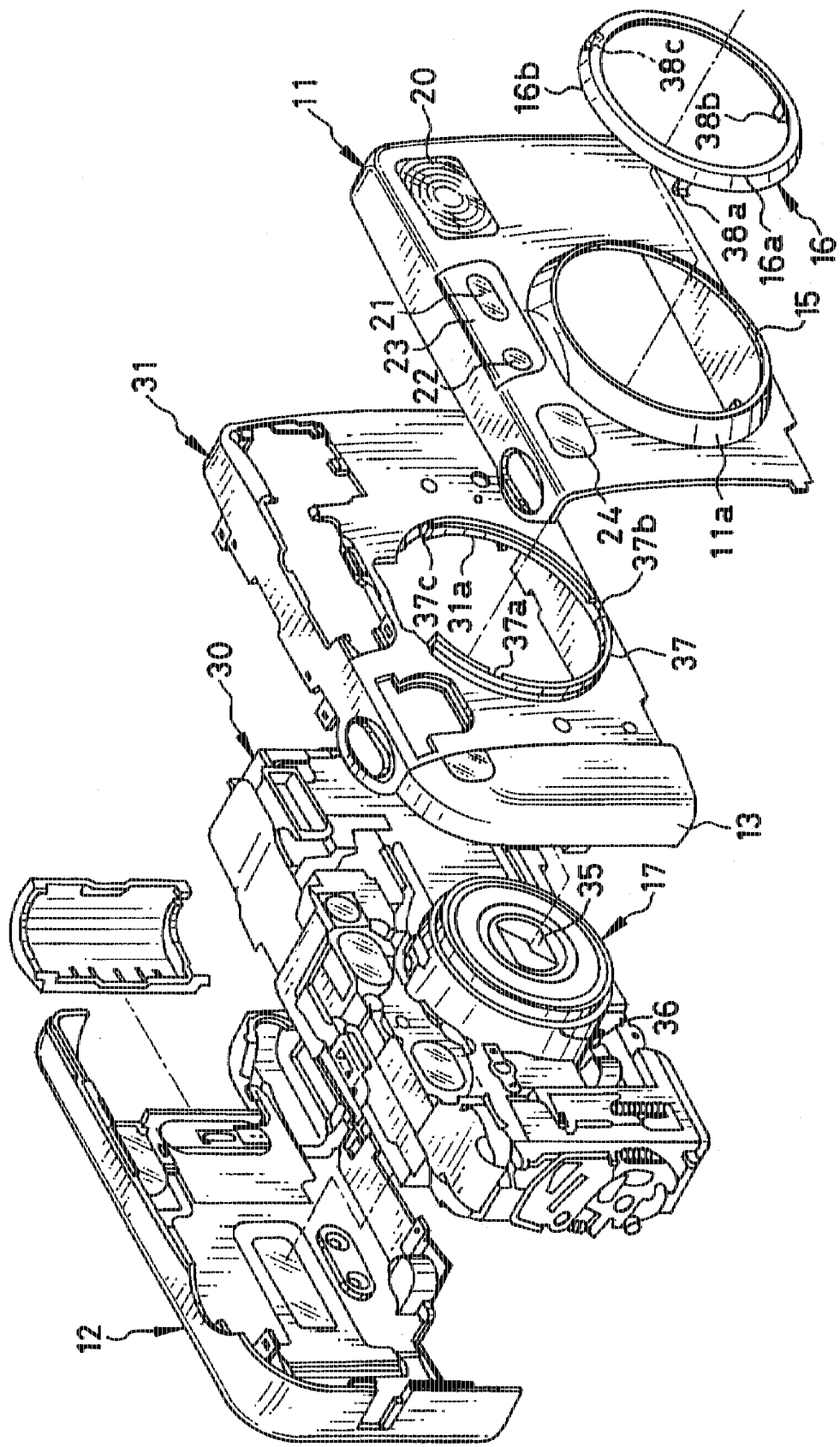
FIG. 3 is an exploded perspective view of the camera shown in FIG. 2.
Figure 4:
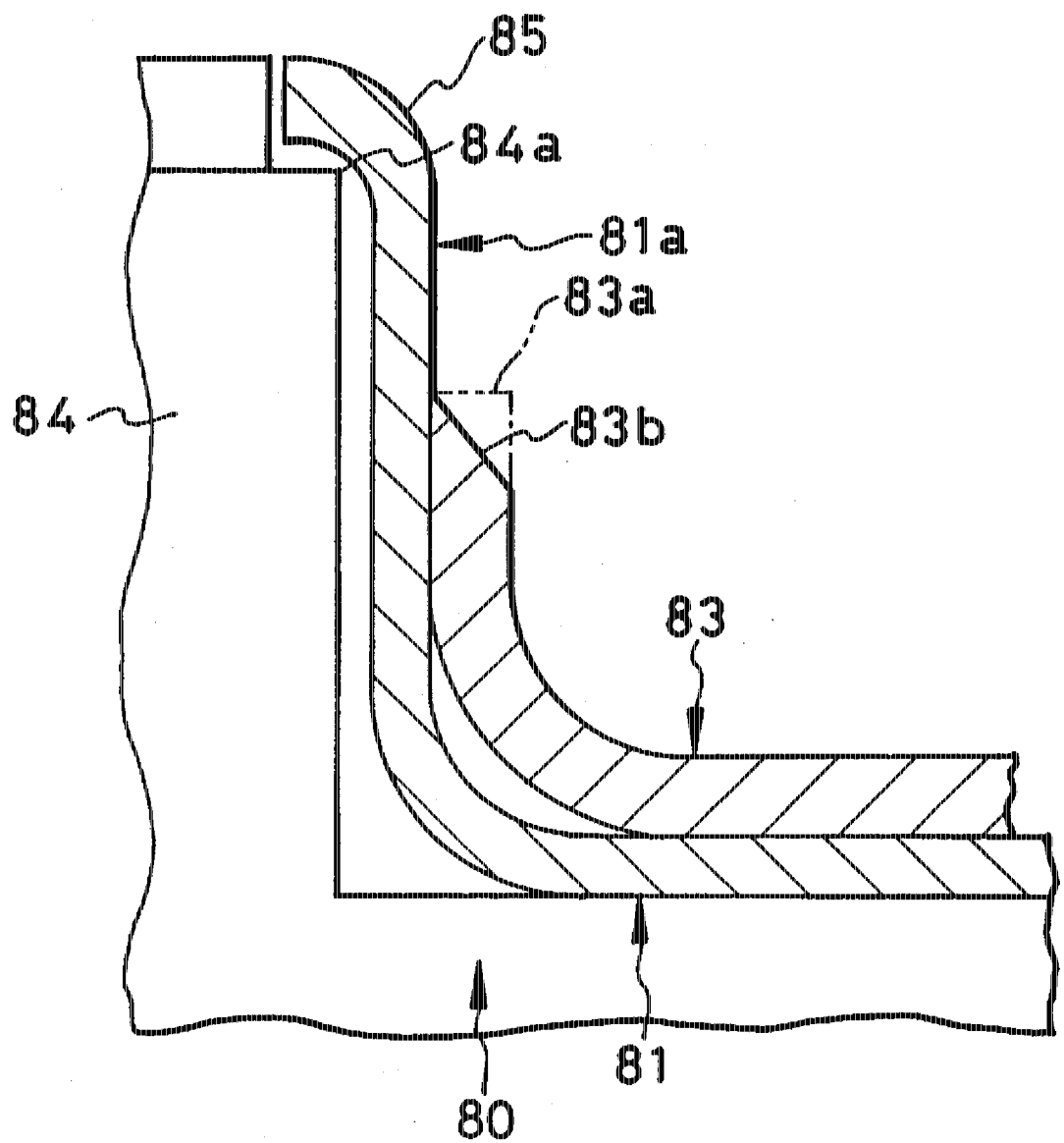
FIG. 4 is an explanatory view illustrating a structure according to prior art.

In FIG. 3, the camera 1 is constituted of a main body 30 and an inner frame 31 which is made of plastic besides the front cover 11 and the rear cover 12. The main body 30 incorporates a photographing mechanism. The inner frame 31 covers the front surface of the main body 30 and is disposed behind the front cover 11. The grip 13 is integrally formed with the inner frame 31.

The lens barrel 17 is provided on a central front portion of the main body 30. The lens barrel 17 is constituted of a plurality of cylinders which are coaxially arranged so that the lens barrel is adapted to be extended and shortened according to zooming. A shutter-type lens cover 35 is provided on the front surface of the lens barrel 17. Upon operating a main switch of the camera 1, the lens cover 35 is automatically opened and closed by a built-in motor.

A circular opening 31a through which the lens barrel 17 of the main body 30 passes is formed in a central front surface of the inner frame 31. An arcuate projection 37, namely a sleeve portion, is formed on periphery of the opening 31a. A radius of the arcuate projection 37 becomes small slightly at a side of top. Three recesses 37a, 37b and 37c are formed at the side along the arc of the projection. The recesses 37a, 37b and 37c are disposed each other at a similar interval.

The front cover 11 is made by pressing an aluminum plate. The projection 37 of the inner frame 31 is adapted to be contained inside the protruding portion 11a formed on the central front portion of the front cover 11. A top end of the upheaval portion 11a becomes an end surface 15 which is manufactured as a plane surface in order to abut closely on the ornamental member 16 (refer to FIG. 1). Moreover, when the front cover 11 is manufactured by pressing, openings are formed at positions corresponding to the flash window 20, the light emitting window 23 for auto-focus and the light receiving window 24 for auto-focus. Each windows 20, 23 and 24 are fixedly secured to the openings respectively.

A corner portion 16a is formed at a front portion of the ornamental member 16 and has a large curvature corresponding to the corner portion 36 of the lens barrel 17. Three engaging claws 38a, 38b and 38c are formed on the rear side of the ornamental member 16 (i.e. the side of the front cover 11). The engaging claws 38a, 38b and 38c are disposed at positions corresponding to the recesses of the inner frame 31.

After the front cover 11 is put on the front surface of the inner frame 31, the engaging claws 38a, 38b and 38c of the ornamental member 16 are adjusted to the recesses 37a, 37b and 37c of the inner frame 31 respectively. In this state, upon pushing the ornamental member 16 toward the front cover 11, the engaging claws 38a, 38b and 38c are guided by the recesses 37a, 37b and 37c of the inner frame 31 and engage with step 37d of the projection 37. On the other hand, a lower surface 16b, namely an end surface of the ornamental member 16, is formed in a plane shape. Thus, the front cover 11 is fixedly secured on the front surface of the inner frame 31 in a state that the lower surface 16b of the ornamental member 16 abuts on the end surface 15 of the protruding portion 11a without gap.

Figure 1:
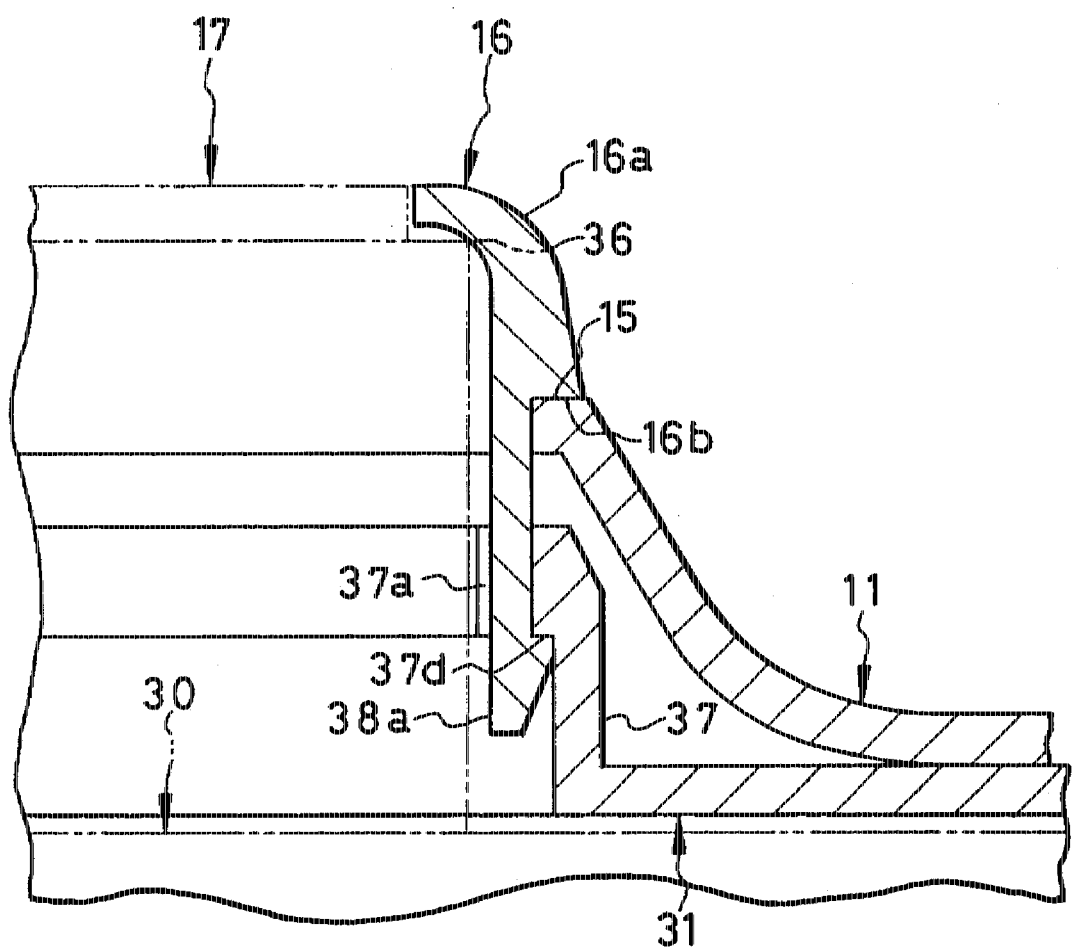
FIG. 1 is an explanatory view illustrating an important portion of the present invention.

Referring to FIG. 1, the cover assembly according to the present invention will be described in further detail. Upon pushing the ornamental member 16 toward the front cover 11, the engaging claw 38a enters the inside of the protruding portion 11a. After that, the engaging claw 38a is guided by the recess 37a and moves toward the main body 30. As the protruding portion 11a of the ornamental member 16 is higher than a predetermined height, the lower surface 16b of the ornamental member 16 first abuts the end surface 15 of the protruding portion 11a. Upon further pushing the ornamental member 16 toward the front cover 11 in this state, the protruding portion 11a is elastically deformed because of its elasticity so that the engaging claw 38a engages with the step 37d of the projection 37. Thus, the front cover 11 is fixed by being caught between the ornamental member 16 and the inner frame 31 in a state that the lower surface 16b of the ornamental member 16 closely contacts with the end surface 15 of the protruding portion 11a.

On assembling the camera 1, the main body 30 is fixed to the rear cover 12 by screws after the main body 30 composed on another line is carried into the line for attaching the cover. Next, the inner frame 31 is fixed to the main body by screws. After that, the front cover 11 is put on the front surface of the inner frame 31 and the ornamental member 16 is pushed against the front cover 11 so as to abut on the end surface 15 of the protruding portion 11a of the front cover 11. Adjusting the engaging claws 38a, 38b and 38c to each of positions of the recesses 37a, 37b and 37c of the inner frame 31, the operation of pushing the ornamental member 16 is carried out. Accordingly, the engaging claws 38a, 38b and 38c engage with the step 37d of the projection 37 so that the ornamental member 16 is attached to the end surface 15 of the protruding portion 11a and the front cover 11 is fixed by being caught between the ornamental member 16 and the inner frame 31.

In above-described embodiment, three engaging claws are provided. However, the number of the engaging claw is not exclusive, for example four engaging claws may be provided. Moreover, independent engaging claws are employed as engaging members of the ornamental member in the embodiment. However, when the plastic material having high flexibility is employed as a material of the ornamental member, convex portions, for example catches or the like, may be provided on a outer surface of a projection which is integrally formed with the ornamental member and formed in a circular or an arcuate shape.

Further, recesses may be provided on a outer surface of a projection which is integrally formed with the ornamental member and formed in a circular or an arcuate shape. In this case, convex portions which engage with the recesses may be provided on the inner frame.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A cover for a camera, comprising:

a main body of said camera;

an inner frame mounted on said main body for covering at least a part of an outer surface of said main body;

a metallic cover mounted on said inner frame;

a first opening formed in said metallic cover;

a protruding portion formed by raising a periphery of said first opening to a predetermined height;

a first end surface formed on top of said protruding portion and in plane shape;

an engaging member for engaging with said inner frame through said first opening; and an ornamental member integrally formed with said engaging member and having a second end surface which is formed in plane shape for closely abutting on said first end surface when said engaging member engages with said inner frame.

2. A cover assembly for a camera according to claim 1, wherein said main body has a lens barrel projecting in a front direction thereof and said inner frame is provided with a second opening through which said lens barrel passes, an outer surface of said lens barrel being covered by said protruding portion of said metallic cover and said ornamental member.

3. A cover assembly for a camera according to claim 1, wherein said protruding portion has elasticity and is elastically deformed when said ornamental member engages with said inner frame.

4. A cover assembly for a camera according to claim 2, wherein said ornamental member is made of plastic.

5. A cover assembly for a camera according to claim 2, wherein said inner frame is made of plastic.

6. A cover assembly for a camera according to claim 2, wherein said engaging member is a engaging claw which engages with a step provided on said inner frame.

7. A cover assembly for a camera according to claim 6, wherein said inner frame is provided with a recess which is located at a position corresponding to said engaging claw for guiding said engaging claw.

8. A cover assembly for a camera, comprising:

a main body of said camera;

a lens barrel provided on said main body and projecting in a front direction thereof;

an inner frame mounted on said main body for covering at least a part of an outer surface of said main body and having a sleeve portion through which said lens barrel passes;

a metallic cover mounted on said inner frame, said metallic cover having an opening corresponding to said sleeve portion; and an ornamental member fitted into said opening and said sleeve portion and formed in sleeve-like shape such that said lens barrel enters said ornamental member.

* * * * *